June 15, 1965  B. F. CHOWN  3,189,763
SWITCHING SYSTEMS FOR STEP-BY-STEP TRANSMISSION
OF ANGULAR QUANTITIES
Filed Jan. 3, 1961  2 Sheets-Sheet 1

INVENTOR
BRUCE FARRELL CHOWN by R. J. Filipkowski
PATENT AGENT

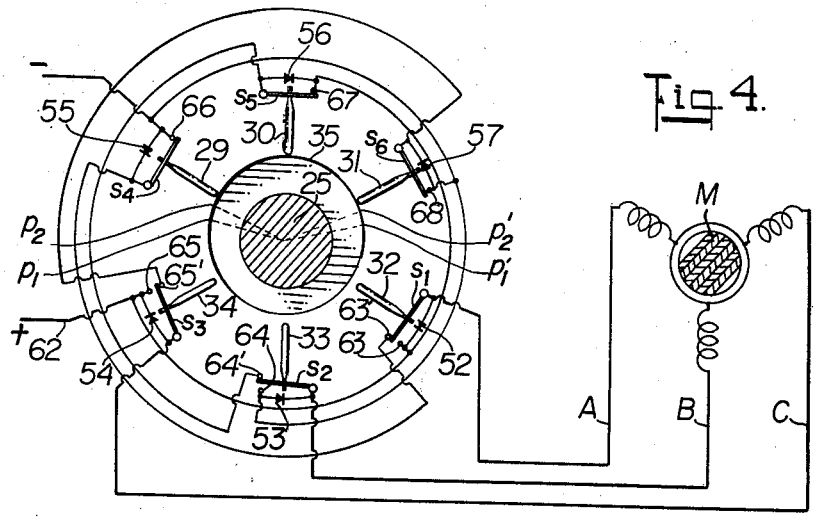

United States Patent Office 3,189,763
Patented June 15, 1965

3,189,763
SWITCHING SYSTEMS FOR STEP-BY-STEP TRANS-
MISSION OF ANGULAR QUANTITIES
Bruce Farrell Chown, Ottawa, Ontario, Canada, assignor
to Computing Devices of Canada Limited, Ottawa, On-
tario, Canada, a company of Canada
Filed Jan. 3, 1961, Ser. No. 80,376
6 Claims. (Cl. 307—113)

This invention relates to torque amplifiers, and more particularly relates to electrical transmission systems of the kind wherein a driven transmitter element essentially comprises an arrangement of electric switching contacts fed from a supply, and a receiver motor connected by a group of conductors with the transmitter essentially consists of a stator supporting a field winding formed with a group of coils and a rotor positionable according to the stator magnetic field developed by excitation of groups of stator field coils, whereby the receiver rotor follows in step-by-step synchronism with positional changes of the transmitter.

When the step-by-step transmission system is employed as an electromechanical amplifier means coupled between a pilot shaft and a load for reproducing a given angular displacement of the pilot shaft as a corresponding angular step movement of a driven shaft from which substantial amounts of output power may be taken, the load imposed by the transmitter must not exceed the work capacity of devices positioning the pilot shaft, particularly where the latter forms part of a sensitive measuring instrument, a counter, or an integrator mechanism.

According to the invention, a transimtter for transmitting a variable quantity essentially consists in an even number of switching elements having their actuators arranged to be displaced by a driven pilot shaft cyclically and in sequence, the poles of two-position switches forming a first group being connected to respective output lines, and the poles of a like number of switches forming a second group being connected by respective conductors with like contacts of the first group of switches, whose other contacts are connected with a supply lead, so that cam means or the equivalent responsive to shaft rotation sequentially actuates the switches whose make-and-break operations are precisely related as to phase with the angular shaft displacement whereby rotor windings of a receiver motor connected with the output lines are energized so as to control the rotor position.

The invention moreover is susceptible of embodiment in apparatus wherein switch actuating means other than mechanical elements control the pattern of energizations.

Heretofore, it has been found that failure of a spring or other restoring member to return a switch to a rest position, for example, or a maladjustment of actuator timing settings, has caused destructive short circuit currents to flow through switch elements and conductors. By the practice of the present invention switching apparatus is provided wherein the switching path between oppositely polarized supply conductors is arranged to include elements of a switch of a first or switching group of switches, in series with elements of a second or distributing group of switches, so that damage cannot occur unless total short circuit occurs within a single switch. Moreover any combination of switches may be operated at any instant.

It is therefore an object of the present invention to provide a switching apparatus for use in an information transmission system having its switching elements arranged so that actuation failure or maladjustment of contact making or breaking cannot cause electrical damage.

The invention will now be more particularly described with reference to the accompanying drawings, in which, FIG. 1 is a perspective view of a preferred embodiment of a transmitter having groups of switches disposed about a common cam for cyclic operation thereby;

FIG. 4 is a schematic circuit diagram showing a complete system consisting of a transmitter of the form of FIG. 1 connected with a receiver motor;

FIG. 5 illustrates cam operation of a type of snap-action switch actuated by a push rod;

FIG. 6 shows a schematic diagram for an in-line arrangement of an even number of switches actuatable by an elongate cam shaft.

Like reference characters indicate like parts throughout the several figures of drawing.

Figure 1:
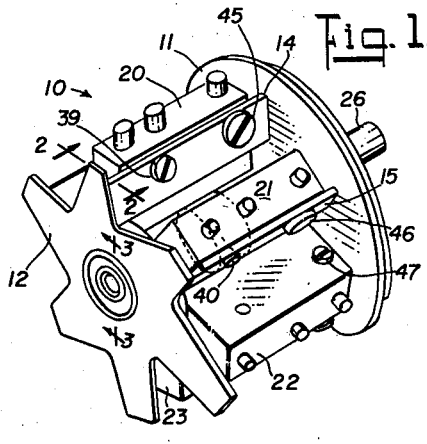
Figure 3:
FIG. 3 is a cross-section view taken through the transmitter of FIG. 1 on line 3—3, showing the journalling of the cam shaft and adjusting support means for the switches.
Figure 2:
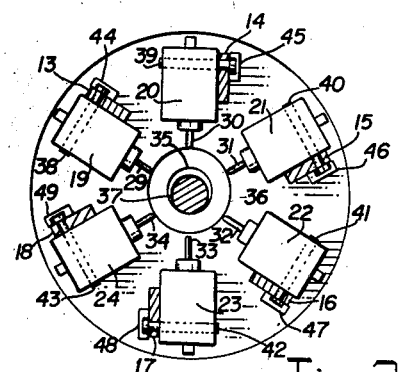
FIG. 2 is an end elevation view on a sectioning plane indicated by line 2—2 in FIG. 1, taken transversely to the drive shaft of the transmitter and showing the cam and switch supports.

Referring to FIGS. 1, 2, and 3, a transmitter generally indicated at 10 comprises a pair of end frames 11 and 12, spaced apart by rigid joining members 13 to 18 inclusive, the said joining members respectively supporting a like number of switches 19 to 24 inclusive, symmetrically disposed in pairs and angularly spaced at peripheral positions 60° apart about the axis of shaft 25 as a consecutive series. One end 26 of the shaft 25 extends beyond the end frame 11 to permit connection therewith by suitable coupling means (not shown) for imparting drive from a low power pilot shaft, for example a meter movement, a synchro receiver motor shaft, or any other angularly variable element of low torque capacity. A pair of antifriction bearings such as miniature shielded ball bearings 27 and 28 journal the shaft in the end frames for free rotation and substantially zero radial deflection.

Each switch 19 to 24 includes an actuator element represented as a push rod designated respectively 29 to 34, which protrudes radially inwards towards the axis of shaft 25, and lies in a plane transverse to the shaft and intersecting a cam body 35 supported on the shaft. The switches of the series are of the form of single pole snap-action devices, a first group 19 to 21 thereof having normally open single contacts and a second group 22 to 24 having each a normally open and a normally closed contact. The switch poles are actuatable to snap into closed circuit relation with the normally open contacts when their respective push rods are moved radially outwardly from the shaft axis beyond a predetermined distance.

A preferred switch of this type, known in the prior art, is characterized by miniature size and a very small actuator displacement to produce a "snap" throw action of the moveable pole. The force required to overcome the opposition of restoring spring mechanism reaches a peak shortly before the pole throws to its alternate position, falling abruptly in magnitude throughout the remainder of its travel when the normally open contact has closed. When the pressure is released the actuator is spring driven toward its protruding limit position, and in moving outwards causes the pole to be thrown to its normal rest position, the push rod pressure rising just after the "break" and decreasing throughout the remainder of the release travel to its limit position.

A cam body 35 preferably has the form of an annular freely rotatable outer roller 36 as shown in FIG. 2 having its axis offset laterally with respect to the axis of an enlarged diameter cylindric section 37 of shaft 25. Alternatively a cam may comprise an annular body rigidly secured upon the shaft section and having a suitably low coefficient of surface sliding friction with respect to the ends of the push rods. The eccentricity of the cam section 35 is so chosen that each push rod is actuated by the cam face throughout a sector of approximately 180° and the switch deflection characteristic is so chosen in relation to the cam eccentricity that the snap action element is actuated to its operated state throughout a lesser sector approximately centered on the aforesaid sector, and spanning about 150° of arc.

In the embodiment shown in FIG. 4, consecutive switch poles of a sub-series designated $S_4$, $S_5$, $S_6$ are illustrated with their push rods 29, 30, and 31 in the operated state, i.e. having their normally open contacts 66, 67 and 68 closed, while the remaining group of switch poles $S_1$, $S_2$ and $S_3$ have their normally open contacts 63, 64 and 65 open and their push rods 32, 33, 34 clear of the cam surface 35. The position of the protruding end of each actuator pin is adjusted in assembling the switches upon respective joining frame members 13 to 18, so that the cam body has a given maximum clearance as will be best understood from FIGS. 2 and 3; each of the rigid spacer frame members as represented by member 14, is disposed parallel to a radial longitudinal plane through the shaft 25 and its corresponding switch's push rod, such as 30. Switch 20 is secured to spacer 14 by means of a first through mounting bolt 39, and by a second adjusting bolt means 45. The bolts are respectively designated 38 to 43 inclusive, and 44 to 49 inclusive. Each switch body is apertured transversely as at 50 by an elongate slot wherein an eccentric 51 formed on the shank of bolt 45 engages the upper and lower walls of the slot, whereby as the bolt shank is rotated a fine adjustment of switch position is provided through the swinging of the switch body about the axis of bolt 39 as center. The clearance distance between the end of push rod 30 and the cam surface at the point of greatest separation may therefore be precisely set; for each switch a similar adjustment is effected.

Referring to FIG. 4 it will be seen that lines A, B, and C supplying the receiver motor generally designated "M" are respectively connected to the poles $S_1$, $S_2$ and $S_3$, which group is illustrated closed on normally closed contacts 63', 64' and 65'. The negative supply lead is connected with contacts 64, 66, and 68 associated with poles $S_2$, $S_4$ and $S_6$. The positive supply lead is similarly connected with the normally open contacts 63, 65, 67 associated with switch poles $S_1$, $S_3$, $S_5$, the latter group having respective push rods 32, 34, and 30, of which 30 alone is elevated.

Line A is negatively polarized from supply over pole $S_1$, contact 63', pole $S_4$, and contact 66. Line B is positively polarized over pole $S_2$, contact 64, pole $S_5$, and contact 67. Line C is negatively polarized over pole $S_3$, contact 65', pole $S_6$, and contact 68.

As the cam rotates, for example in the clockwise direction, a push rod such as 31 associated with switch pole $S_6$ whose contact 68 has been operated, i.e., closed, will descend the curved face of the cam, and the contact will be thrown open when the push rod lies midway between points $p_2'$ and $p_1'$. At the same time the contact point 65 of switch $S_3$ diametrically opposite $S_6$ remains open and is not closed until further anticlockwise rotation of cam body 35 brings $p_1$ past the push rod 34 so that the contacting tip thereof lies midway between $p_1$ and $p_2$. With contact 68 opened, line C will have positive polarity applied over contact 65 and pole $S_3$. If, however, $S_3$ fails to throw, no short circuit will occur unless $S_6$ also stays closed and a fault in $S_3$ bridges contacts 65 and 65'.

A continuous rotation of the shaft 25 will be seen to produce twelve snap actuations of the six switches, i.e. each pole will be operated consecutively to occupy its alternate rest position throughout an arc of less than 180° of shaft rotation but not less than about 150°, and released to its normal rest position throughout the remainder of each revolution of the shaft.

The characteristics of snap action switches are such that a given small deflection of an actuator such as a push rod or roller with respect to a mean position produces, for one sense of movement, a contact-closing snap action of open switch contacts, while for reverse movement from the mean position a snap opening of closed contacts is produced. These characteristics are generally exemplified by FIG. 5, wherein a push rod 30 for one type of snap switch (not shown) is actuated by a cam portion 60. In this drawing the deflection distances have been deliberately exaggerated for purpose of clarity. In the mean deflection position as shown in solid outline the push rod rests on $p_2$, and in the closed contact state and open contact state shown right and left thereof in dotted outlines, rests respectively on points $p_3$ and $p_1$ of the cam face The opening and closing "throws" are produced by the shaft rotations $\theta_1$ and $\theta_2$ respectively.

The "throw" for each contact opening snap action is the difference in radial distance between the center of cam rotation, about 0, and the points $p_1$, $p_2$, and for contact closing is the difference between distances to points $p_2$ and $p_3$.

If in FIGS. 2 and 4 it be assumed that the cam and shaft is turning clockwise, it will be seen that push rod 31 is undergoing displacement outwardly by an ascending face of the cam, and exerts a force opposing the movement, while push rod 29 is descending a similarly sloped portion of the cam face, and while push rod 30 dwells at its furtherest inward deflection distance. The net torque required to be applied to rotate shaft 25 will be substantially only that necessary to overcome frictional resistance of the push rods against the cam face in the case of a sliding cam follower, or bearing friction in the case of a roller cam. Any inequality of load due to pressure exerted by push rod and switch mechanism in the rising cycle as compared with the pressure exerted by a push rod and switch mechanism which is descending will require additional input torque. By suitable choice of switch characteristics so that a very low peak operating force is required at any shaft angle, and by arranging that the actuation forces for the group of switch actuators are largely balanced throughout their ascending and descending movements, very low average and peak torque loads are imposed on a driving source so that the latter may be a low power element even when controlling a receiver motor having a power output hundreds of times greater.

Figure 7:
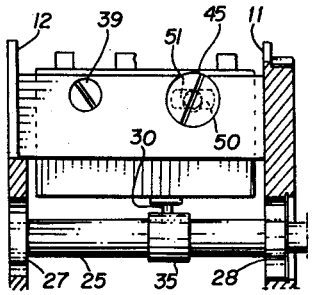
FIG. 7 illustrates the energization pattern for the output conductors with respect to transmitter shaft position for systems employing two groups of three switches each.

In general, the respective angles $\theta_2$ and $\theta_1$ will be comparable, but not necessarily equal, and in any case will be chosen so that the sum $(\theta_1 + \theta_2)$ is less than the angular span of the guard sector whose extent corresponds to the angle of shaft rotation during which a line conductor remains disconnected from the electrical supply. In the embodiment of FIGS. 2 and 4, the pattern of energization of line conductors A, B, and C is as shown by FIG. 7, each conductor being cyclically and alternately energized at positive or negative supply potential applied throughout an angular displacement of shaft 25 of approximately 150 degrees, the sectors being separated at 30° intervals.

It will be seen that the receiver motor armature M will be stepped through twelve equally angularly spaced consecutive positions as shaft 25 of the transmitter 10 is rotated.

The suppression of sparking at the transmitter contacts at each make or break of current in the field coils is desirable in order to avoid contact burning or sticking. To this end, each of the normally open contacts 63, 64, 65, 66, 67, and 68 is connected by respective diode elements 52, 53, 54, 55, 56, and 57 with its switch pole of respective switches $S_1$, $S_2$, $S_3$, $S_4$, $S_5$ and $S_6$. By this provision the transmitter may be operated over very wide ranges of speed with consistent freedom from sparking at the switch contacts, while at very low rates of shaft rotation the positive snap action avoids entirely the damaging effects resulting from the use of wipers and commutator segments of the prior art. Where the angular displacement of the transmitter shaft is oscillatory, the angular tolerance provided by the cam and snap action prevents undue pulsing.

While the foregoing description has specifically described a system employing a miniature transmitter having six snap action switches spaced angularly by 60° about a cam shaft axis, it will be appreciated that a greater number of switches may be similarly employed when a number of line conductors numerically equal to half the number of switches are used with a receiver motor having a number of coils equal to the number of line conductors. Referring to FIG. 6, an in-line arrangement is illustrated also employing six switches arranged as a consecutive series comprised as a group of three single-pole, double throw distributing switches. Any larger number of switches may similarly be employed provided the number of switches in each group is the same and provided that the intermediate conductors such as 69, 70, and 71 link the normally closed contacts such as 63', 64', 65' of double-throw switches 19, 20, and 21, with respective diametrically oppositely positioned poles $S_4$, $S_5$, $S_6$ of switches 22, 23, 24. The expression "diametrically opposite" is to be understood in the sense that a cam face 59 of a cam of any form rotating about axis 58 actuates follower devices 29 to 34 in such way that a follower such as 30 is fully released while a follower such as 33 is fully raised, i.e., the angular difference between respective cam positions being 180° of shaft revolution about axis 58.

The embodiment of FIG. 6 is particularly useful in systems where very fine stepping intervals, for example of the order of 5 degrees of arc, may be required, the number of line conductors A, B, C, . . . being increased in proportion with the number of single-pole double throw switches, and a like number of single-pole single throw switches being provided, each connected by an intermediate conductor with the normally closed contact of the respective distributing switch. The nature of the cam shaft need not be limited to a plurality of eccentrically mounted discs, as in FIG. 2, as those skilled in the art of cam design will readily be able to provide suitable cam forms for producing the required operation of follower devices.

I claim:

1. Switching apparatus for use in a position information transmission system comprising a plurality of output terminals, a first group of a like plurality of switches each having a single pole connected wtih a respective terminal and having a normally open and a normally closed contact, a like plurality of conductors each connected with a respective normally closed contact of said first group of switches, a second group of a like plurality of switches each having a normally open contact and having a single pole connected by a respective conductor with the normally closed contact of a corresponding switch in said first group, all of said switches of said first and second groups comprising a consecutive series, means connecting normally open contacts of alternate switches of said series for biasing in one polarity and means connecting remaining normally open contacts for biasing in opposite polarity, and position-dependent movable actuator means operatively associated with all said switches and effective to selectively actuate switch poles of a sub-series of consecutive switches equal in number to said plurality to engage their normally open contacts, whereby to energize said output terminals in a predetermined pattern of said opposite polarities characteristic of the position of said actuator means.

2. Switching apparatus for use in a position information transmission system, comprising a plurality of output terminals, a single consecutive series of switches comprising a first group of a like plurality of switches disposed in a first sequence and each having a movable pole element connected electrically with a respective terminal and having a normally open and a normally closed contact, a like plurality of conductors each connected with respective normally closed contacts, said series also comprising a second group of a like plurality of switches disposed in a second sequence following said first sequence and each having a normally open contact and having a single movable pole element connected by a respective conductor with a normally closed contact of a corresponding switch of said first group, means connecting odd numbered normally open contacts for biasing in one polarity and means connecting even numbered normally open contacts for biasing in opposite polarity, and position-dependent actuator means for actuating said movable elements in predetermined patterns.

3. A transmitter for an angular position information system comprising, a plurality of output terminals, a first group of a like plurality of single pole double throw switches having a normally open and a normally closed contact and having their poles connected with said terminals, a second group of a like plurality of switches having a single pole and a normally open contact, said groups comprising a consecutive series and being supported in said transmitter, means connecting the normally closed contacts of switches of said first group with poles of corresponding switches of said second group, a rotatable shaft journalled in said transmitter having cam actuator means for sequentially actuating said poles of said switches to closed contact position with their normally open contacts at predetermined angular positions of said shaft, each pole being actuated consecutively on rotation of said shaft, means connecting alternate normally open contacts of said switches for biasing with one polarity, and means connecting the normally open contacts of remaining switches for biasing with opposite polarity.

4. Switching means as claimed in claim 1 wherein said actuator means comprises an eccentric cam supported for rotation about an axis for cyclically actuating poles of said sub-series of switches.

5. Switching means as claimed in claim 2 wherein each group comprises three switches and said series is arranged with each switch equiangularly spaced about a common axis, and wherein said position-dependent actuator means comprises a cam shaft operative to actuate the switch poles of a like plurality of consecutive switches to engage their normally open contacts throughout a shaft rotation angle less than 180 degrees but not less than about 150 degrees.

6. Switching apparatus as claimed in claim 3 wherein a diode element is connected between each movable element and its normally open contact in opposing relation with the polarization of said contact.

References Cited by the Examiner

UNITED STATES PATENTS

| | | | |
|---|---|---|---|
| 2,367,522 | 1/45 | Pfleger | 340—176 |
| 2,433,836 | 1/48 | Bowne | 340—352 |
| 2,706,287 | 4/55 | Pawley et al. | 200—5 |
| 2,750,584 | 6/56 | Goldfischer | 340—176 |
| 2,778,197 | 1/57 | Legeza | 200—140 |
| 2,892,132 | 6/59 | Mallory | 317—156 |
| 3,056,892 | 10/62 | Ormond | 307—132 |

LLOYD McCOLLUM, *Primary Examiner.*

MAX L. LEVY, ROBERT L. SIMS, *Examiners.*